(12) United States Patent
Nichols et al.

(10) Patent No.: US 11,875,608 B1
(45) Date of Patent: Jan. 16, 2024

(54) APPARATUS AND METHOD FOR GENERATING A VEHICLE MAINTENANCE ACTIVITY

(71) Applicant: Quick Quack Car Wash Holdings, LLC, Roseville, CA (US)

(72) Inventors: Joseph Matthew Nichols, Rocklin, CA (US); Christopher Clinton Chappell, Lincoln, CA (US); Joseph Allen Steele, III, Plumas Lake, CA (US); Josh David Schumacher, Sacramento, CA (US)

(73) Assignee: Quick Quack Car Wash Holdings, LLC

( * ) Notice: Subject to any disclaimer, the term of this patent is extended or adjusted under 35 U.S.C. 154(b) by 0 days.

(21) Appl. No.: 18/195,597

(22) Filed: May 10, 2023

(51) Int. Cl.
*G07C 5/00* (2006.01)
*G06V 10/764* (2022.01)

(52) U.S. Cl.
CPC ........... *G07C 5/006* (2013.01); *G06V 10/764* (2022.01)

(58) Field of Classification Search
None
See application file for complete search history.

(56) References Cited

U.S. PATENT DOCUMENTS

| 2022/0165104 A1* | 5/2022 | Gardiner | ........ G06Q 10/063112 |
| 2022/0237713 A1* | 7/2022 | Rosas-Maxemin | .... G06Q 20/12 |

FOREIGN PATENT DOCUMENTS

| CN | 108528405 A | * | 9/2018 | ................ B60S 3/04 |
| CN | 109032144 A | * | 12/2018 | .......... G05D 1/0221 |
| CN | 108528405 B | | 5/2019 | |
| CN | 113971821 A | | 1/2022 | |
| CN | 114299467 A | | 4/2022 | |
| KR | 10-2022-0124430 A | | 9/2022 | |

* cited by examiner

*Primary Examiner* — Abdhesh K Jha
(74) *Attorney, Agent, or Firm* — Caldwell Intellectual Property Law

(57) ABSTRACT

An apparatus and method for generating a vehicle maintenance activity, wherein the apparatus includes at least a processor and a memory communicatively connected to the at least a processor, the memory containing instructions configuring the at least a processor to receive image data, identify at least an indicator from the image data, receive vehicle data as a function of the indicator, classify the vehicle data to a plurality of vehicle data categories, and generate a vehicle maintenance activity as a function of the classified vehicle data.

18 Claims, 9 Drawing Sheets

APPARATUS AND METHOD FOR GENERATING A VEHICLE MAINTENANCE ACTIVITY

FIELD OF THE INVENTION

The present invention generally relates to the field of data recognition. In particular, the present invention is directed to an apparatus and method for generating a vehicle maintenance activity.

BACKGROUND

Current methods of verifying information at an entry point are insufficient. There is a need for a method wherein authorization at an entry point allows access to a plurality of data to provide a personalized experience upon entry.

SUMMARY OF THE DISCLOSURE

In an aspect, an apparatus for generating a vehicle maintenance activity, wherein the apparatus includes at least a processor and a memory communicatively connected to the at least a processor, the memory containing instructions configuring the at least a processor to receive image data, identify at least an indicator from the image data, receive vehicle data as a function of the indicator, classify the vehicle data to a plurality of vehicle data categories, and generate a vehicle maintenance activity as a function of the classified vehicle data.

In another aspect, a method for generating a vehicle maintenance activity, wherein the method includes receiving, by a computing device, image data, identifying, by the computing device, at least an indicator from the image data, receiving, by the computing device, vehicle data as a function of the indicator, classifying, by the computing device, the vehicle data to a plurality of vehicle data categories, and generating, by the computing device, a vehicle maintenance activity as a function of the classified vehicle data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for generating a vehicle maintenance activity. In an embodiment, a vehicle maintenance activity may be a carwash setting.

Aspects of the present disclosure can be used to verify a vehicle and/or driver at an entry point of facility, such as a carwash, wherein, a computing device is configured to generate a personalized vehicle maintenance activity based on the data related to the driver of vehicle.

Exemplary embodiments illustrating aspects of the present disclosure are described below in the context of several specific examples.

Figure 1A:
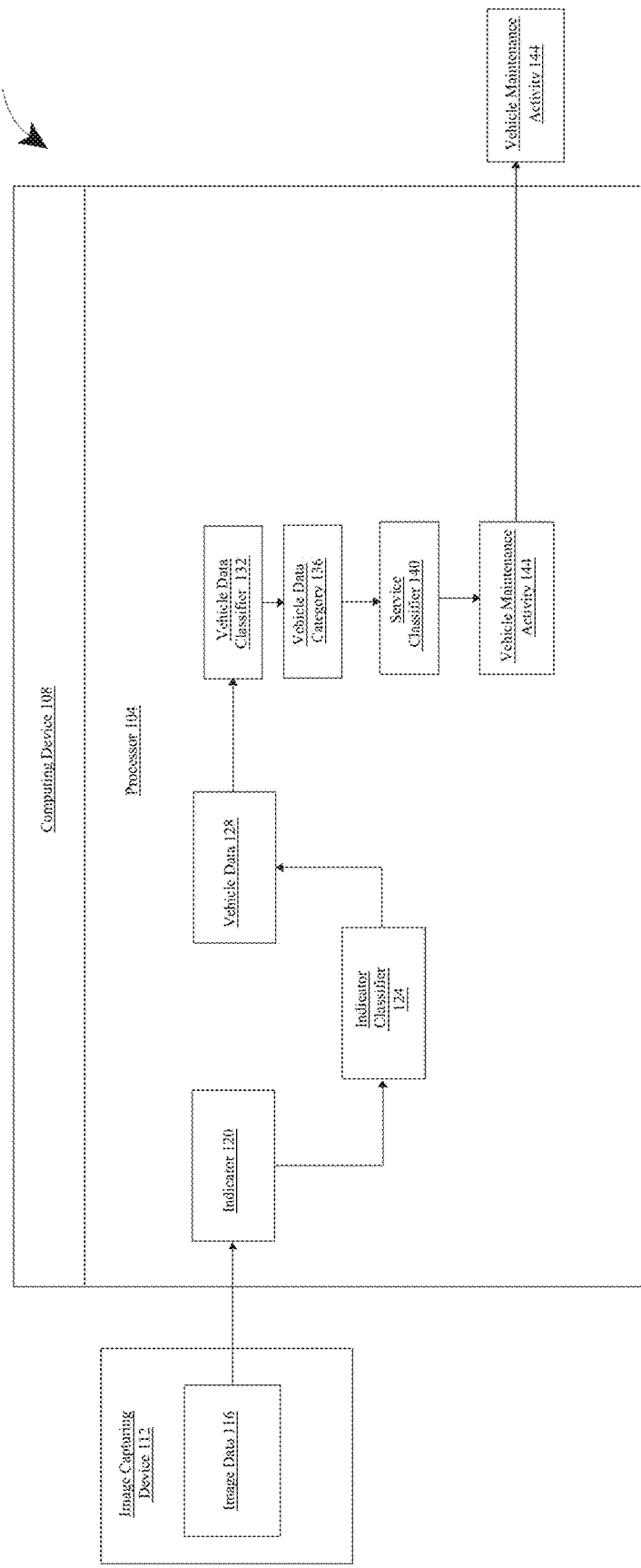
FIG. 1A is a block diagram illustrating an apparatus for generating a vehicle maintenance activity.

Referring now to FIG. 1A, an exemplary embodiment of an apparatus 100 for generating a vehicle maintenance activity is illustrated. Apparatus 100 includes a processor 104. Processor 104 may include, without limitation, any processor described in this disclosure. Apparatus 100 include a memory communicatively connected to the at least a processor, the memory containing instructions configuring the at least a processor to carry out the generating process. As used in this disclosure, "communicatively connected" means connected by way of a connection, attachment or linkage between two or more related which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure. Processor 104 and memory may be included in a computing device 108. Computing device 108 may include any computing device as described in this disclosure, including without limitation a microcontroller, microprocessor, digital signal processor (DSP) and/or system on a chip (SoC) as described in this disclosure. computing device 108 may include, be included in, and/or communicate with a mobile device such as a mobile telephone or smartphone. computing device 108 may include a single computing device operating independently, or may include two or more computing device operating in concert, in parallel, sequentially or the like; two or more computing devices may be included together in a single computing device or in two or more computing devices. computing device 108 may interface or communicate with one or more additional devices as described below in further detail via a network interface device. Network interface device may be utilized for connecting computing device 108 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 108 may include but is not limited to, for example, a computing device or cluster of computing devices in a first location and a second computing device or cluster of computing devices in a second location. computing device 108 may include one or more computing devices dedicated to data storage, security, distribution of traffic for load balancing, and the like. computing device 108 may distribute one or more computing tasks as described below across a plurality of computing devices of computing device, which may operate in parallel, in series, redundantly, or in any other manner used for distribution of tasks or memory between computing devices. computing device 108 may be implemented, as a non-limiting example, using a "shared nothing" architecture.

With continued reference to FIG. 1A, computing device 108 may be designed and/or configured to perform any method, method step, or sequence of method steps in any embodiment described in this disclosure, in any order and with any degree of repetition. For instance, computing device 108 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 108 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1A, computing device 108 is configured to receive image data 116. As used in this disclosure, "image data" is information representing at least a physical scene, space, and/or object. In some cases, image data may be generated by a camera. "Image data" may be used interchangeably through this disclosure with "image," where image is used as a noun. Image data 116 may relate to an image of vehicle. An image may be optical, such as without limitation where at least an optic is used to generate an image of an object. An image may be material, such as without limitation when film is used to capture an image. An image may be digital, such as, without limitation, when represented as a bitmap. In a non-limiting example, plurality of image data 116 may illustrate various components and/or features of the vehicle such as vehicle's body, color, make, model, license plate, and the like. In some cases, plurality of image data 116 may be captured by plurality of image capturing device, as still images, or frames from a video stream. In other cases, plurality of image data 116 may be taken as a "burst" of vehicle images by a plurality of image capturing devices 112, as a video feed including a live-streamed video of the vehicle. A "burst" of vehicle images, as described herein, is a set of images of a single object, such as the vehicle, taken in rapid succession. A burst may be performed by repeated manually actuated image captures, or may be an "automated burst," defined as a set of images that are automatically triggered by plurality of image capturing devices 112; an automated burst may be initiated by a manual actuation of, for example, without limitation, a camera button while in an automated burst mode configuring at least an image capture device of plurality of image capturing devices 112 and/or any computing device 108 to perform and/or command automated burst upon a manual actuation, or may be triggered by an automated process and/or module such as a program, hardware component, application, a command or instruction from a remote device, or the like.

Still referring to FIG. 1A, apparatus may receive image data 116 from a plurality of image capturing devices 112. As used in this disclosure, an "image capturing device" is a device that is capable of acquiring visual information in a form of digital images or videos. In an embodiment, each image capturing device of plurality of image capturing devices 112 may include a usage of a photosensitive element. In a non-limiting example, a plurality of image capturing devices 112 may include a plurality of cameras. A "camera," as described herein, is a device that is configured to sense electromagnetic radiation, such as without limitation visible light, and generate an image representing the electromagnetic radiation. In some cases, the at least a camera may include one or more optics. For the purposes of this disclosure, an "optic" is a device that focuses and directs electromagnetic radiation to a target area. Exemplary non-limiting, the optics may include spherical lenses, aspherical lenses, reflectors, polarizers, filters, windows, aperture stops, and the like. In some cases, the at least a camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, the at least a camera may be sensitive within a non-visible range of electromagnetic radiation, such as without limitation infrared. Image capturing device 112 may include embodiments as disclosed in U.S. patent application Ser. No. 18/195,537, filed on May 10, 2023, entitled "APPARATUS AND METHOD FOR AUTOMATIC LICENSE PLATE RECOGNITION OF A VEHICLE," the entirety of which is incorporated as a reference.

With continued reference to FIG. 1A, an exemplary image capturing device 112 may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video.

Still referring to FIG. 1A, image capturing device 112 may be equipped with a machine vision system. A machine vision system may use images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented by instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1A, in some embodiments, plurality of image capturing devices 112 may capture two or more perspectives for use in three-dimensional (3D) reconstruction. Plurality of image capturing devices 112 may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL may operate at depth ranges of about 50 cm to about 300 cm. Persons skilled in the art, upon reviewing the entirety of this disclosure, will be aware of various types of cameras that may be used for the disclosure.

With continued reference to FIG. 1A, in some embodiments, plurality of image capturing devices 112 may include at least a photodetector. For the purposes of this disclosure, a "photodetector" is any device that is sensitive to light and thereby able to detect light. In some embodiments, the at least a photodetector may be implemented in a camera. As a non-limiting example, the at least a photodetector may convert the light into electrical signals that can be processed by the camera's electronics to create an image. In some embodiments, the at least a photodetector may be implemented in the LiDAR system as described below. As a non-limiting example, the at least a photodetector may receive laser light from a light detecting and ranging (LiDAR) system that reflects off an object, such as but not limited to a vehicle, or environment and may convert it into an electrical signal, such as but not limited to LiDAR data of plurality of image data 116.

Still referring to FIG. 1A, computing device 108 is configured to receive an indicator 120 from the image data

116. As used in this disclosure, an "indicator" is a symbol or plurality of symbols configured to identify an object or entity. A symbol may include a mark or character used as a conventional representation of an object, function, or process, and the like. In some embodiments, indicator may include a symbol or plurality of symbols located on a license plate, also referred to as a vehicle credential plate or a vehicle credential, of a vehicle. In a non-limiting example, indicator 120 may include a character such as, without limitation, a letter, a number, or a special character. In a non-limiting example, image data 116 may contain and image of a vehicle license plate, wherein the plurality of indicator 120 may include a combination of letters, numbers, and/or special characters, horizontal or vertical stacked in single, or multiple rows within license plate region, such as the license plate number. In some cases, each indicator 120 of plurality of indicator 120 may include a same/different font size (i.e., 6 inches by 12 inches, 520 mm by 110 mm. 372 mm by 134 mm, and/or the like) or a same/different font style (e.g., standard, embossed, italic, condensed, gothic, retro, and/or the like), In some cases, each indicator 120 of plurality of indicator 120 may be in a same/different font color (e.g., white, green, blue, yellow, black, red, and/or the like) Additionally, or alternatively, indicator 120 may include a presence of other elements within the license plate region, such as, without limitation, jurisdiction name, logo/emblem/symbol, registration sticker, hologram, or the like. Further, indicator 120 may be in a computer readable format; for instance, and without limitation, indicator 120 may be expressed solely in textural/numerical format. Indicator 120 may include embodiments as disclosed in U.S. patent application Ser. No. 18/195,537.

Still referring to FIG. 1A, computing device 108 may identify an indicator 120 using optical character recognition techniques, in some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1A, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1A, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1A, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 1A, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes as described throughout this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1A, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks as described in this disclosure.

Still referring to FIG. 1A, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1A, computing device 108 is configured to receive vehicle data 128 as function of the indicator 120. "Vehicle data," as used herein, is information related to a vehicle. Vehicle data 128 may include a user identification. "User identification," as used herein, is information related to a driver of the vehicle. The driver may be the owner or authorized user of the vehicle. An authorized user may be a user listed on legal documents, such as vehicle insurance, or users listed on an account, such as a client account of a carwash facility. As a non-limiting example, the driver information may include name, gender, date of birth, residency, religion, driver history, occupation, family, billing information, contact information, emergency contact, driver's license, state ID, photo ID, billing information such as but not limited to payment method, payment information, payment history, and the like.

Still referring to FIG. 1A, vehicle data 128 may include a vehicle identification. A "vehicle identification," as used herein, is information describing a vehicle. As a non-limiting example, the vehicle information of the vehicle data 128 may include the make, model, model version, model year, manufacturer contact information, country of manufacturer, body type, color, coating, steering type, wheel type, tire size, tire type, number of wheels, standard seat number, optional seat number, engine specifications, engine capacity, fuel type, fuel tank capacity, average fuel consumption, maximum permissible weight, vehicle height, vehicle length, vehicle width, vehicle status, such as but not limited to damage status, presence of vehicle accessories, title records, theft records, accident records, insurance records, vehicle ID, interior fabric, license plate number—an alphanumeric credential, and the like. In some embodiments alphanumeric credential may include a license plate number. An "alphanumeric credential," for the purposes of this disclosure, is an key including both numbers and letter that identifies an object or entity.

Still referring to FIG. 1A, vehicle data 128 may include service information. "Service information," as used herein, is information related to past service performed on a vehicle. As a non-limiting example, the service information may include a service history such as but not limited to wash service history, vacuum service history, tire service history, ceramic coating service history, and the like. As a non-limiting example, the service information may a include driver's service preference such as but not limited to washing preference for a carwash. Wash preferences may include soap type, water temperature, number of rinse and the like. In some embodiments, a service preference may relate to a digital content preference regarding what type of digital content should be displayed onto a vehicle during the carwash base. A digital content preference may be based on age, interests, and the like. The user identification may be associated with the service information. As in, when received by the computing device 108, the service information is correlated to the vehicle owned by a particular user. In some embodiments, the service information may be updated based on a generated vehicle maintenance activity 144 as described further below.

Still referring to FIG. 1A, vehicle data 128 may include fee information. "Fee information," a used herein, is a pecuniary value associated with a service performed on a vehicle. Fee information may include in prices, discounts, promotional prices, and the like. In some embodiments, fee information may include the duration of promotional/discounted prices, promo/discount codes associated with a service, and the like, For example, a price of a standard carwash may be $12, wherein a discounted price may be $9. Vehicle data 128 may be received from a vehicle database. A "vehicle database," as used herein, is a data structure populated with information related to a vehicle. Databases, as described throughout this disclosure, may be implemented, without limitation, as a relational database, a key-value retrieval database such as a NOSQL database, or any other format or structure for use as a database that a person skilled in the art would recognize as suitable upon review of the entirety of this disclosure. Databases may alternatively or additionally be implemented using a distributed data storage protocol and/or data structure, such as a distributed hash table or the like. Databases may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1A, vehicle data 128 may be received from a remote computing device. A "remote computing device," as used herein is a computing device operated by a third party. A third party may refer to a driver of a vehicle or the operator of a business. A remote computing device may be communicatively connected to computing device 108. In some embodiments, vehicle data 128 may be received utilizing a chatbot through a graphical user interface. A "graphical user interface (GUI)," as used herein, is a graphical form of user interface that allows users to interact with electronic devices. In some embodiments, GUI may include icons, menus, other visual indicators, or representations (graphics), audio indicator such as primary notation, and display information and related user controls. In some embodiments, a third party may submit user identification, vehicle identification, information, fee information, service preference, and the like through GUI, such as submitting documents or text or audio input of data. In some embodiments, vehicle data 128 may be received through a chatbot utilizing GUI. As used in the current disclosure, a "chatbot" is a computer program designed to simulate conversation with users. A chatbot operating on a GUI may prompt questions for a third party asking for vehicle data 128.

Still referring to FIG. 1A, computing device 108 may retrieve vehicle data 128 based on one or more indicators 120. For example, the license plate number of a vehicle may be identified then matched to vehicle data 128 containing the same license plate number. Computing device 108 may retrieve vehicle data 128 based on one more indicators 120 utilizing a machine-learning model such as a classifier, as described further below. An indicator classifier 124 may be configured to receive image data 116 and indicator 120 as an input and output correlating vehicle data 128. An indicator classifier 124 training data set may correlate indicator 120 to vehicle data 128.

Still referring to FIG. 1A, computing device 108 is configured to classify the vehicle data to a plurality of vehicle data categories 136. A "vehicle data category," as used herein is a classification of vehicle data 128 to a type of vehicle related information. A vehicle data category 136 may include a user ID category, vehicle ID category, service information category, service preference category and the like. Computing device 108 may classify vehicle data 128 using a machine-learning model, such as a vehicle data classifier 132. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A vehicle data classifier 132 may be configured to output at least a datum that labels or otherwise identifies a set of data that are clustered together, found to be close under a distance metric as described below, or the like. Computing device 108 and/or another device may generate classifiers, as described throughout this disclosure, using a classification algorithm, defined as a processes whereby a computing device 108 derives a classifier from training data. A vehicle data classifier training data set may include training data correlating elements of user identification information, vehicle data 128, and/or indicators 120 to a vehicle data group. Vehicle data classifier 132 may be configured to receive vehicle data 128 as an input and output a plurality of vehicle datum classified to vehicle data categories 136.

Still referring to FIG. 1A, classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Computing device 108 may be configured to generate classifiers as used in this disclosure using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A) \div P(B)$, where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 108 may then calculate a likelihood table by calculating probabilities of different data entries and classification labels. Computing device 108 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1A, computing device 108 may be configured to generate classifiers as used in this disclosure using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1A, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute $1$ as derived using a Pythagorean norm: $l=\sqrt{\sum_{i=0}^{n}a_i^2}$ where ai is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1A, in some embodiments, computing device 108 may be configured to perform a verification function based on the imaging data and vehicle data 128 received. Computing device 108 may verify indicator 120 or other information obtained from image data 116 and reference the vehicle data 128 to verify that at least an indicator 120 correlates to an element of vehicle data 128. For example, when a car approaches as car wash entrance, imaging device may capture a picture of the vehicle indicting the license plate, vehicle model, vehicle make, vehicle color, and the like. The license plate number obtained from the license plate may be checked against the license plate number retrieved from vehicle data 128. If the license plate numbers do not match then access to the car wash may be denied. In some cases, computing device 108 may be configured to verify two or more parameters, such as the license plate and a photo of the driver, of the license plate, and the make/model/color of the vehicle, and the like. In some embodiments, computing device 108 may be configured to generate a fraud alert and transmit the fraud alert to a remote computing device operated by a third party. For example, the manager of the carwash may receive the alert along with the authorized driver of the vehicle. A "fraud alert," as used herein is a notification of denied access. The fraud alert may contain information that could not be verified or failed to match vehicle. For example, the fraud alert may contain the incorrect license plate number, incorrect make/model/color of the vehicle and the like. Computing device 108 may perform the verification function using a machine-learning model, such as a classifier as described above. In some embodiments, verification may be performed using optical character recognition, as described above.

Still referring to FIG. 1A, computing device 108 is configured to generate a vehicle maintenance activity 144 as a function of the classified vehicle data 128. A "vehicle maintenance activity," as used herein, is a service to be performed on a vehicle. Vehicle maintenance activity 144 may include a type of carwash service, such a wash service, digital content service, vacuum service, drying service, ceramic coating service, and the like. Vehicle service activities 144 may be uniquely generated depending on vehicle data 128 and/or the plurality of vehicle data categories 136. For example, a wash service may particularize the type and quantity of soap used and pre-soak time during the service. In another example, vehicle maintenance activity 144 may include providing personalized animation during a carwash as a function of the digital content preference. In another example, vehicle maintenance activity 144 may be uniquely generated based on vehicle data 128, such as, the vehicle height, vehicle length, vehicle width, the vehicle paint composition, and the like. Such personalization of vehicle maintenance activity 144 may be based on the service information of vehicle data 128, as described above.

Still referring to FIG. 1A, computing device 108 may generate a vehicle maintenance activity 144 using a machine-learning model, such a service classifier 140, when personalization of vehicle maintenance activity 144 is dependent on one vehicle data category 136 of the plurality of data categories. Service classifier 140 may receive a vehicle data 128 classifier output, such as a vehicle data category 136, as an input and output vehicle maintenance activity 144. Service classifier 140 may be trained using service activity training data set correlating vehicle data 128 to a plurality of vehicle maintenance activity 144 associated with a vehicle data category 136. For example, a vehicle identification category highlighting the make and model of a vehicle may be correlated to a particular wash service, wax service, and the like. Computing device 108 may generate vehicle maintenance activity 144 dependent on a plurality of inputs obtained from vehicle data 128 and vehicle data categories 136 using a fuzzy set inference system, as described further below. For example, classified vehicle data 128 may be represented a fuzzy set compared and ranked against a plurality of vehicle maintenance activity 144 fuzzy sets to determine an optimal vehicle maintenance activity 144 to generate. Optimal may refer to a certain degree of match and/or benefit a vehicle service may provide compared to the classified vehicle data 128.

Still referring to FIG. 1, apparatus 100 may be further configured to track a plurality of vehicle maintenance activities 144 performed on a vehicle. In some embodiments, plurality of vehicle maintenance activities may be tracked during a predetermined time frame for purposes such as billing. A predetermined time frame may be a day, month, year, and the like. In an embodiment, computing device 108 may update vehicle data 128 with vehicle maintenance activity 144 and subsequently generate and iteratively update a pecuniary record. A "pecuniary record," as used herein, is a data structure containing invoice related information. For example, a pecuniary record may be an invoice containing all past services performed on a vehicle and the fee information, as described above, associated with it. The pecuniary record may contain billing information of a driver or proprietor of a vehicle. Billing information may be received from vehicle data 128 as described above. In some embodiments, pecuniary record may include receipt of payment, credit, discounts, and the like. Pecuniary record may also include payments owed, reimbursed, and the like. Computing device 108 may receive notice of a payment through a GUI/UI and/or a chatbot as described though this disclosure. For example, in carwash facility embodiment, a vehicle may drive up to the entrance of a carwash, wherein a driver may have the option to insert a payment card into a remote payment device communicatively connected to computing device 108. Notice of payment may be a component of vehicle data 128.

Still referring to FIG. 1, computing device 108 may generate a pecuniary record using a pecuniary classifier configured to receive vehicle data after generation or completion of vehicle maintenance activity 144 and output the pecuniary record. Pecuniary classifier may include classifiers as described above. Pecuniary classifier may be trained by a pecuniary training data set correlating vehicle maintenance activities, indicators, notices of payment and the like to a pecuniary record. Computing device 108 may transmit the pecuniary record at the end of a predetermined time period to a remote computing device operated by a third party as described above.

With continued reference to FIG. 1, in some embodiments, computing device 108 may associate vehicle maintenance activity 144 to a pecuniary record as a function of indicator 120 and/or vehicle data 128. In some embodiments, computing device 108 may look up an existing pecuniary record in a pecuniary record look up table. Pecuniary records in pecuniary record look up table may be associated with indicators 120 or aspects of vehicle data 128. Indicators 120 or aspects of vehicle data 128 may be used to find an existing pecuniary record in pecuniary record look up table associated with a vehicle or user. Computing device 108 may update existing pecuniary record as a function of vehicle maintenance activity 144. As a non-limiting example, computing device 108 may record that vehicle maintenance activity 144 was performed on a vehicle within pecuniary record. As a non-limiting example, computing device 108 may add a new amount owed by a user or vehicle, or may update the amount owed by the user or vehicle in pecuniary record.

Figure 1B:
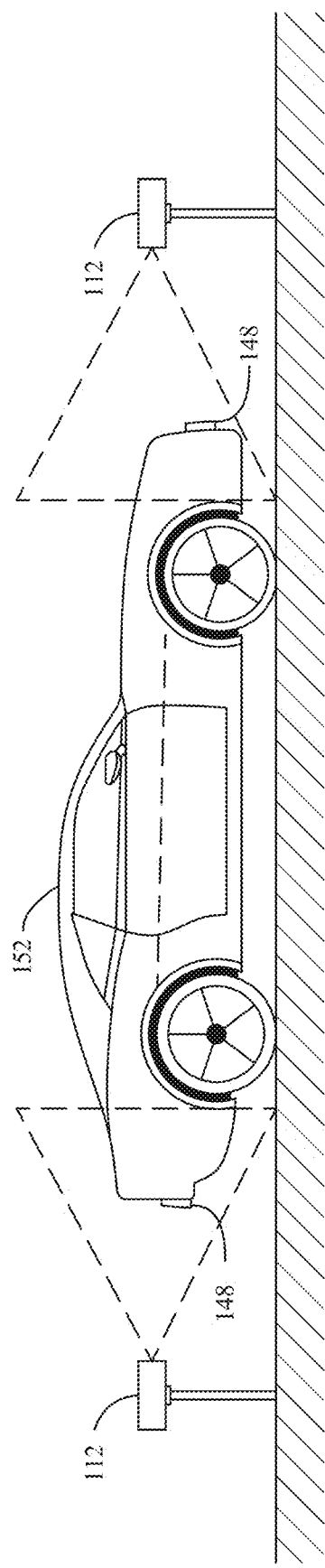
FIGS. 1B-C is an illustration of exemplary embodiments of an apparatus for generating a vehicle maintenance activity as a vehicle verification system.
Figure 1C:
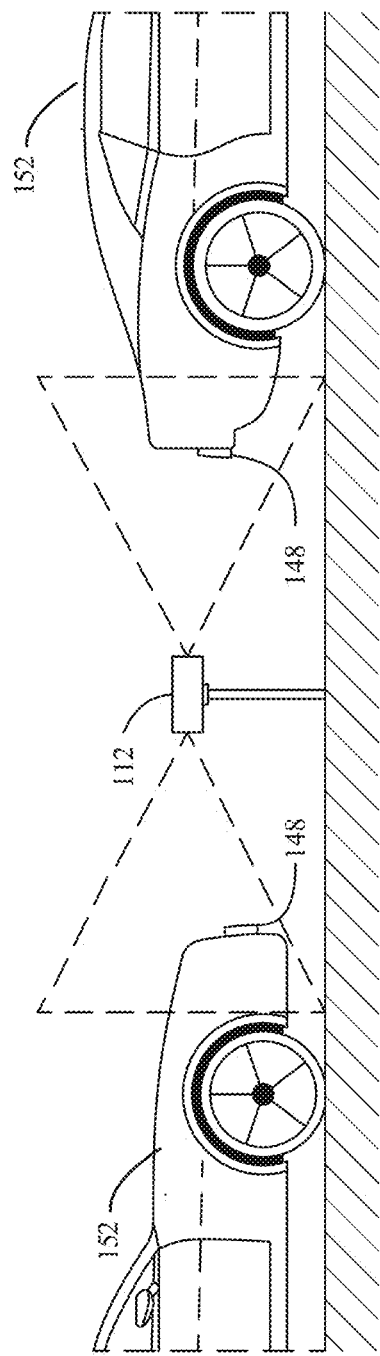

Referring now to FIG. 1B-C, an exemplary embodiment of apparatus 100 as a vehicle verification system is illustrated. Apparatus 100 may be used to verify image data 116 associated with a vehicle 152. A "vehicle," a sued herein, is apparatus for human or cargo transportation. A vehicle may include a car, truck, cart, and the like. FIG. 1B-C is an exemplary illustration of image capturing device of apparatus 100. The image capturing device depicted may scan for the credentials 148 of the vehicle 152. A credential may refer to a form of identification, such as a license plate of a vehicle. A credential may be an indicator 120 or image data 116 directly correlated to the identification of a vehicle or driver. In an embodiment, a credential 148 may be used to validate of the user's identity or the vehicles identity. A vehicle 152 may include any means by which someone or something may be transported. As a non-limiting example, the vehicle 152 may include a car, SUV, sedan, hatchback, sports car, ATV, go cart, truck, bus, motorcycle, bicycle, watercraft, aircraft, snowcraft, and the like. Some vehicles 152 may be configured to have multiple credentials 148 that are associated with it. In a non-limiting, example a vehicle 152 may be configured to have two credentials associated with a front and a rear license plate, respectively. In another non-limiting example, a first credential may be associated with the vehicle identification number associated with the vehicle, while the second credential comprises an RFID Tag. Examples of a credential 148 may include but is not limited to an RFID Tag, license plate, vehicle identification number, driver's license, key card, and the like. In an embodiment, a credential 148 may be located on the dashboard, rearview mirror, front license plate, rear license plate, front windshield, rear windshield, driver's side windows, passenger's side windows, and the like of the vehicle 152. Apparatus 100 may be positioned according to the location of the credential. In some embodiments, image capturing device 112 may be mounted in an elevated position. In other embodiments, image capturing device 112 may be mounted on the left of right side of the vehicle. Image capturing device 112 may be mounted at or near the height of the vehicle 152, as depicted in FIG. 1B-C. FIG. 1B may depict the use of multiple image capturing device 112 to verify the credentials associated with the vehicle 152. FIG. 1C may depict an exemplary embodiment of apparatus 100 with multiple view windows 108. The embodiment of apparatus 100 depicted in FIG. 1C may include multiple image capturing device 112 within one waterproof housing. Each of these image capturing device 112 may be aligned with a separate view window. Image capturing device 112 may be configured to be rotatably mounted. As used in the current disclosure, "rotatably mounted" is being securely mounted in a location while allowing for rotation along at least one axis.

Figure 2:
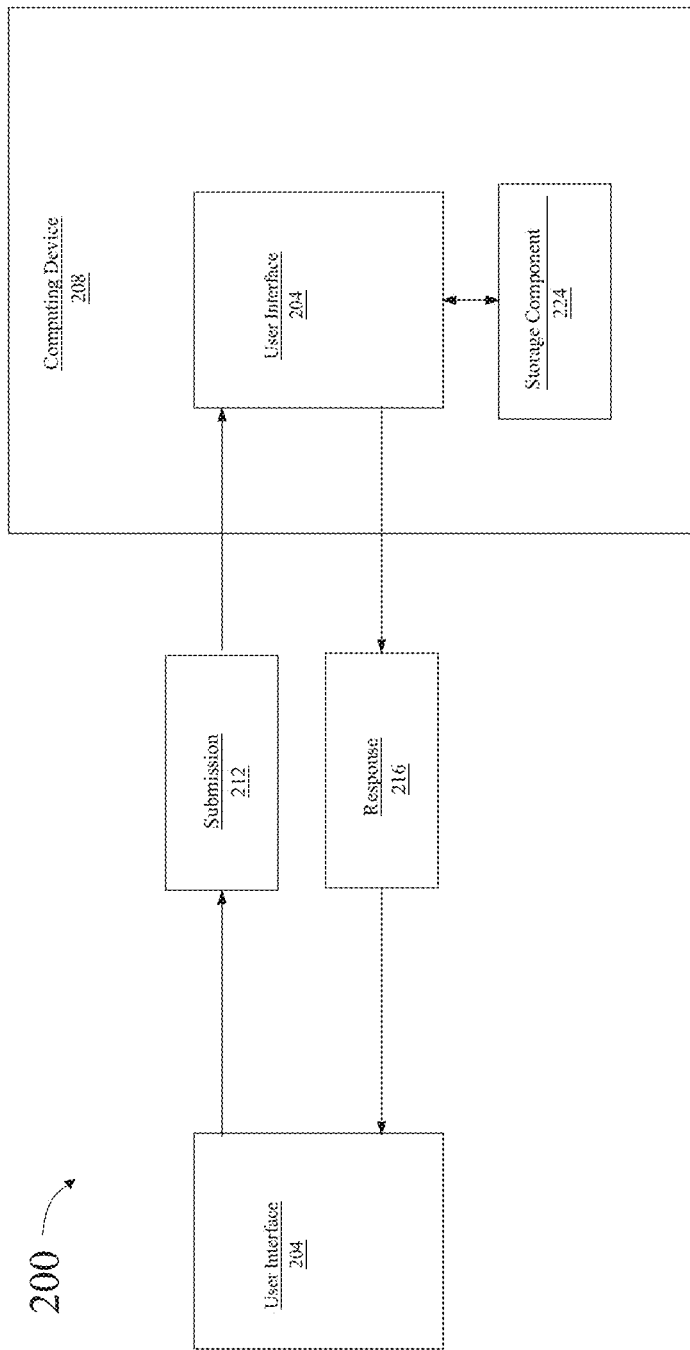
FIG. 2 is a block diagram illustrating a Chatbot.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both of submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 212 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 108 as an input to another function, as described through this disclosure.

Figure 3:
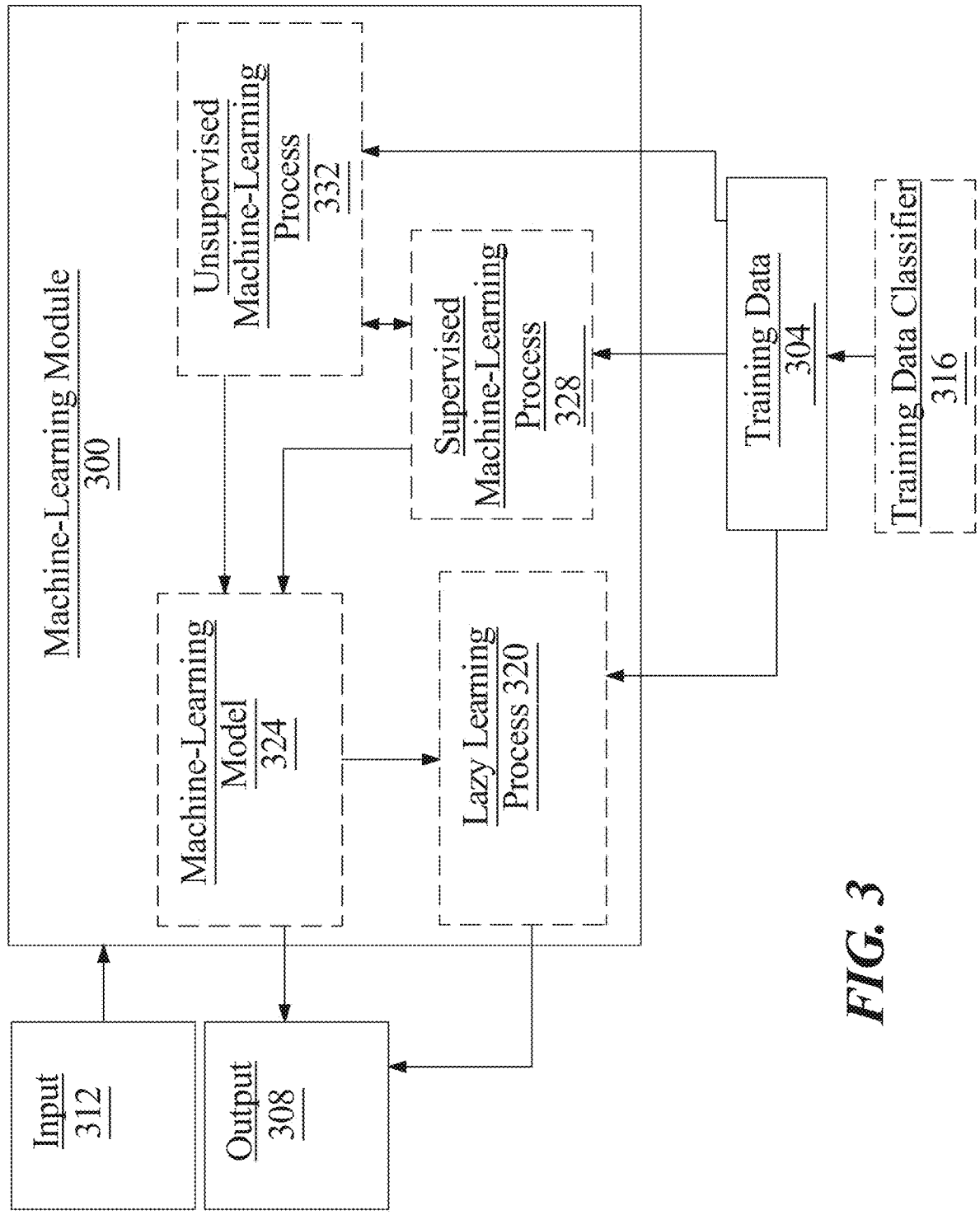
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a classifier which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network including an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include inputs and outputs described through this disclosure, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods.

Machine-learning algorithms may include neural net algorithms, including convolutional neural net processes.

Figure 4:
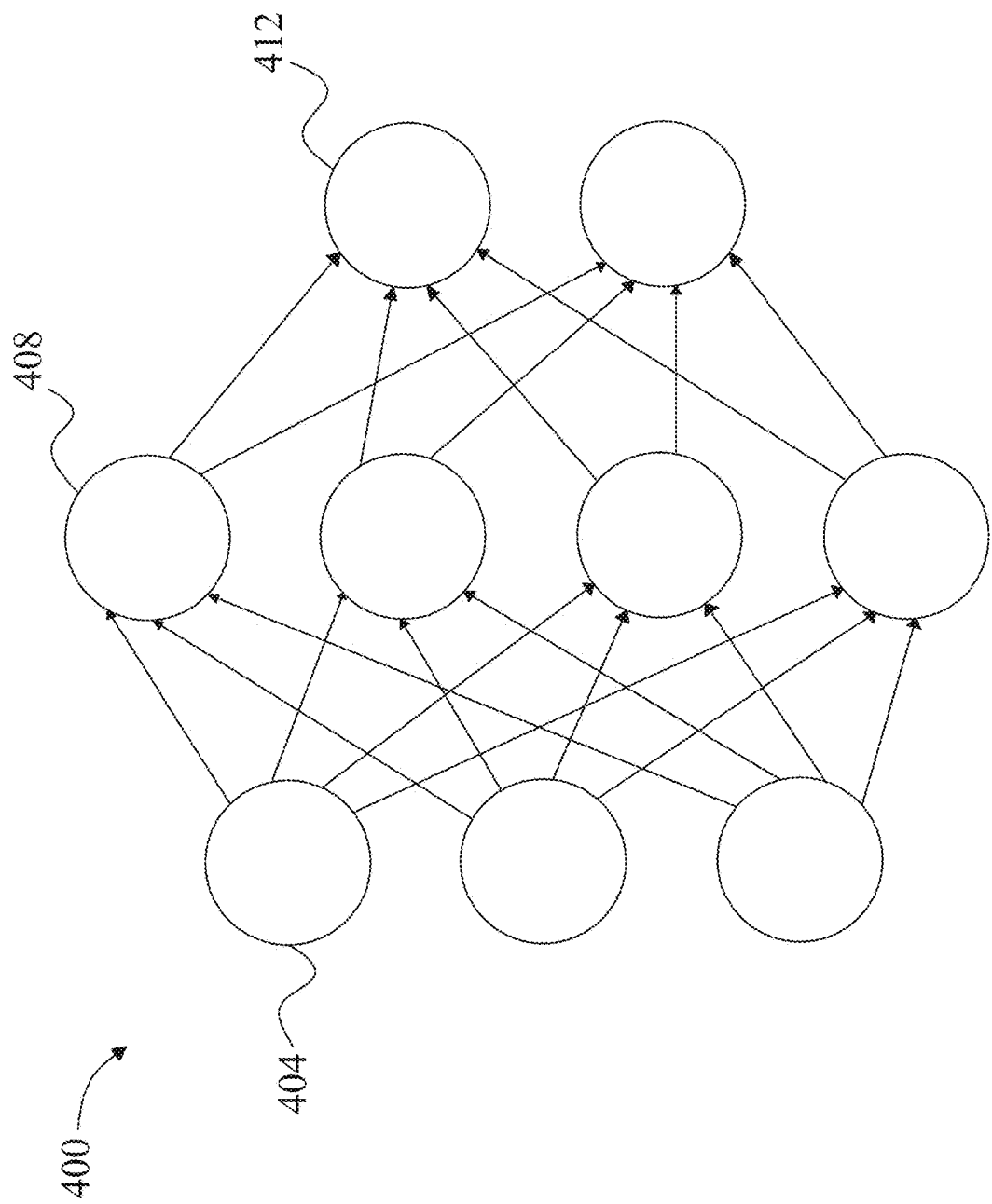
FIG. 4 is a diagram of an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network."

Figure 5:
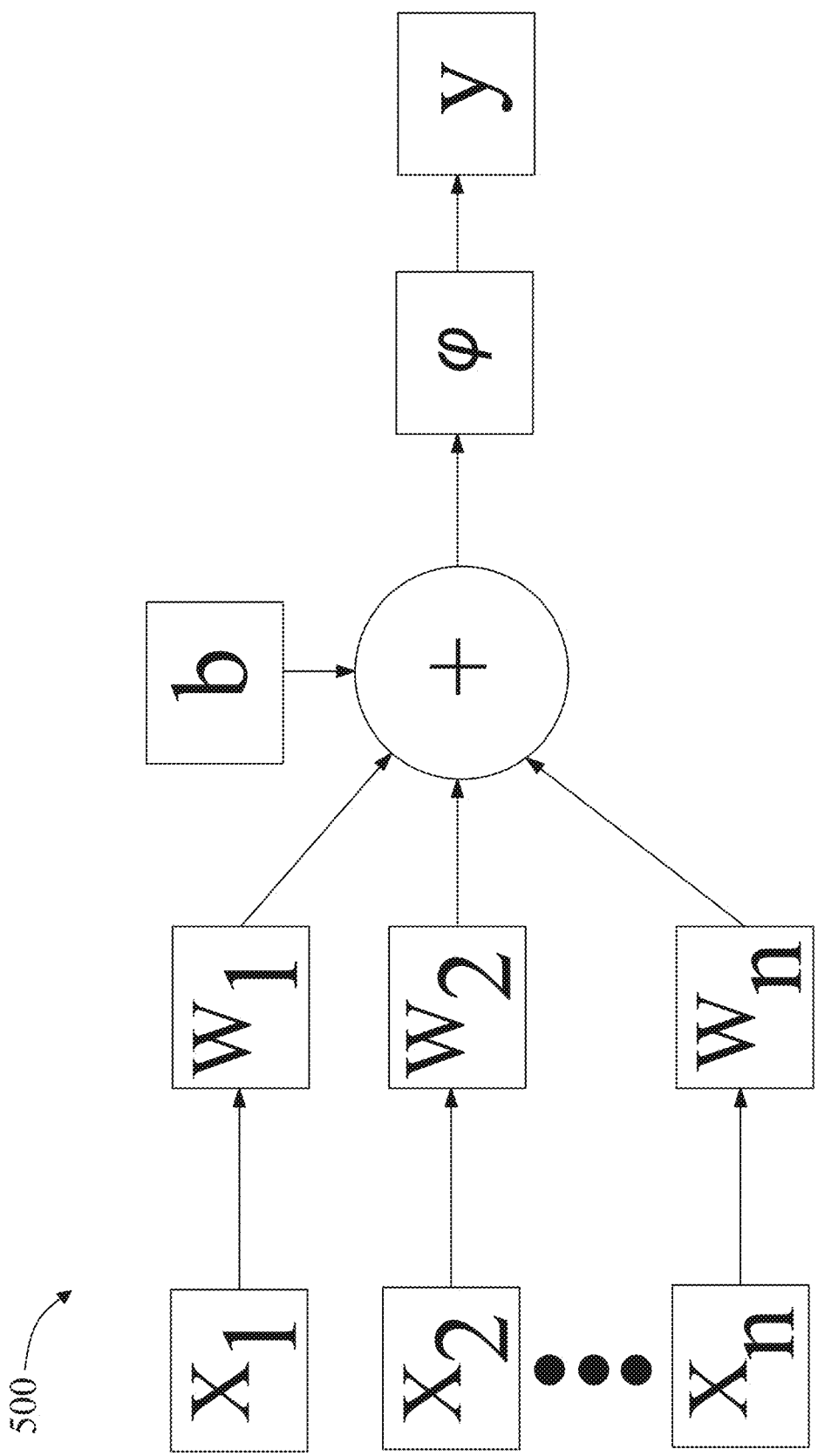
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
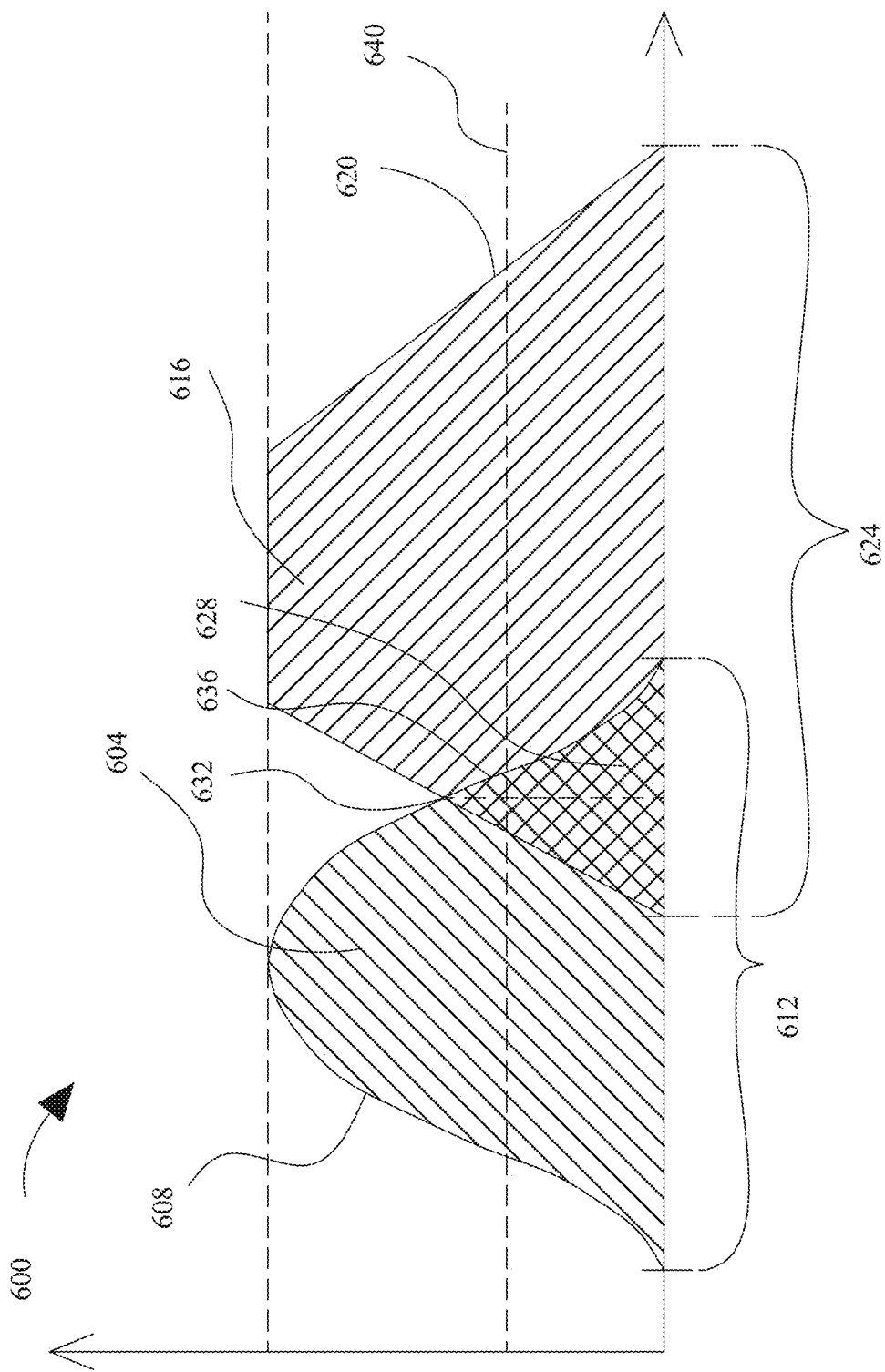
FIG. 6 is a diagram of an of fuzzy set comparison.

Referring to FIG. 6, an exemplary embodiment of fuzzy set comparison 600 is illustrated. A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 6, first fuzzy set 604 may represent any value or combination of values as described above, including output from one or more machine-learning models, classified vehicle data, and a predetermined class, such as without limitation of vehicle maintenance activity. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 628 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, threshold may indicate a sufficient degree of overlap between an output from one or more machine-learning models and/or classified vehicle data and a predetermined class, such as without limitation vehicle maintenance activity categorization, for combination to occur as described above. Alternatively or additionally, each threshold may be tuned by a machine-learning and/or statistical process, for instance and without limitation as described in further detail below.

Further referring to FIG. 6, in an embodiment, a degree of match between fuzzy sets may be used to classify an classified vehicle data with vehicle maintenance activity. For instance, if a vehicle maintenance activity has a fuzzy set matching classified vehicle data fuzzy set by having a degree of overlap exceeding a threshold, computing device may classify the classified vehicle data as belonging to the vehicle maintenance activity categorization. Where multiple fuzzy matches are performed, degrees of match for each respective fuzzy set may be computed and aggregated through, for instance, addition, averaging, or the like, to determine an overall degree of match.

Still referring to FIG. 6, in an embodiment, an classified vehicle data may be compared to multiple vehicle maintenance activity categorization fuzzy sets. For instance, classified vehicle data may be represented by a fuzzy set that is compared to each of the multiple vehicle maintenance activity categorization fuzzy sets; and a degree of overlap exceeding a threshold between the classified vehicle data fuzzy set and any of the multiple vehicle maintenance activity categorization fuzzy sets may cause computing device 108 to classify the classified vehicle data as belonging to a vehicle maintenance activity categorization. For instance, in one embodiment there may be two vehicle maintenance activity categorization fuzzy sets, representing respectively a first vehicle maintenance activity categorization and a second vehicle maintenance activity categorization. First vehicle maintenance activity categorization may have a first fuzzy set; Second vehicle maintenance activity categorization may have a second fuzzy set; and classified vehicle data may have an classified vehicle data fuzzy set. computing device 108, for example, may compare an classified vehicle data fuzzy set with each of vehicle maintenance activity categorization fuzzy set and in vehicle maintenance activity categorization fuzzy set, as described above, and classify a classified vehicle data to either, both, or neither of first vehicle maintenance activity categorization nor in second vehicle maintenance activity categorization. Machine-learning methods as described throughout may, in a non-limiting example, generate coefficients used in fuzzy set equations as described above, such as without limitation x, c, and σ of a Gaussian set as described above, as outputs of machine-learning methods. Likewise, classified vehicle data may be used indirectly to determine a fuzzy set, as classified vehicle data fuzzy set may be derived from outputs of one or more machine-learning models that take the classified vehicle data directly or indirectly as inputs.

Still referring to FIG. 6, a computing device may use a logic comparison program, such as, but not limited to, a fuzzy logic model to determine a vehicle maintenance activity response. An vehicle maintenance activity response may include, but is not limited to, inappropriate, good, average, optimal, and the like; each such vehicle maintenance activity response may be represented as a value for a linguistic variable representing vehicle maintenance activity response or in other words a fuzzy set as described above that corresponds to a degree of match calculated using any statistical, machine-learning, or other method that may occur to a person skilled in the art upon reviewing the entirety of this disclosure. In other words, a given element of classified vehicle data may have a first non-zero value for membership in a first linguistic variable value such as "beneficial" and a second non-zero value for membership in a second linguistic variable value such as "optimal" In some embodiments, determining a vehicle maintenance activity categorization may include using a linear regression model. A linear regression model may include a machine learning model. A linear regression model may be configured to map data of classified vehicle data, such as degree of match to one or more vehicle maintenance activity parameters. A linear regression model may be trained using a machine learning process. A linear regression model may map statistics such as, but not limited to, quality of classified vehicle data match. In some embodiments, determining an vehicle maintenance activity of classified vehicle data may include using a vehicle maintenance activity classification model. An vehicle maintenance activity classification model may be configured to input collected data and cluster data to a centroid based on, but not limited to, frequency of appearance, linguistic indicators of quality, and the like. Centroids may include scores assigned to them such that quality of match of classified vehicle data may each be assigned a score. In some embodiments vehicle maintenance activity classification model may include a K-means clustering model. In some embodiments, vehicle maintenance activity classification model may include a particle swarm optimization model. In some embodiments, determining the vehicle maintenance activity of an classified vehicle data may include using a fuzzy inference engine. A fuzzy inference engine may be configured to map one or more classified vehicle data elements using fuzzy logic. In some embodiments, classified vehicle data may be arranged by a logical comparison program into vehicle maintenance activity arrangement. An "vehicle maintenance activity arrangement" used in this disclosure is any grouping of objects and/or data based on skill level and/or output score. This step may be implemented as described above in FIGS. 1-5. Membership function coefficients and/or constants as described above may be tuned according to classification and/or clustering algorithms. For instance, and without limitation, a clustering algorithm may determine a Gaussian or other distribution of questions about a centroid corresponding to a given match level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 6, an inference engine may be implemented according to input and/or output membership functions and/or linguistic variables. For instance, a first linguistic variable may represent a first measurable value pertaining to classified vehicle data, such as a degree of match of an element, while a second membership function may indicate a degree of benefit in vehicle maintenance activity of a subject thereof, or another measurable value pertaining to classified vehicle data. Continuing the example, an output linguistic variable may represent, without limitation, a score value. An inference engine may combine rules, such as: "if the match level is 'high' and the benefit level is 'high', the vehicle maintenance activity score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Figure 7:
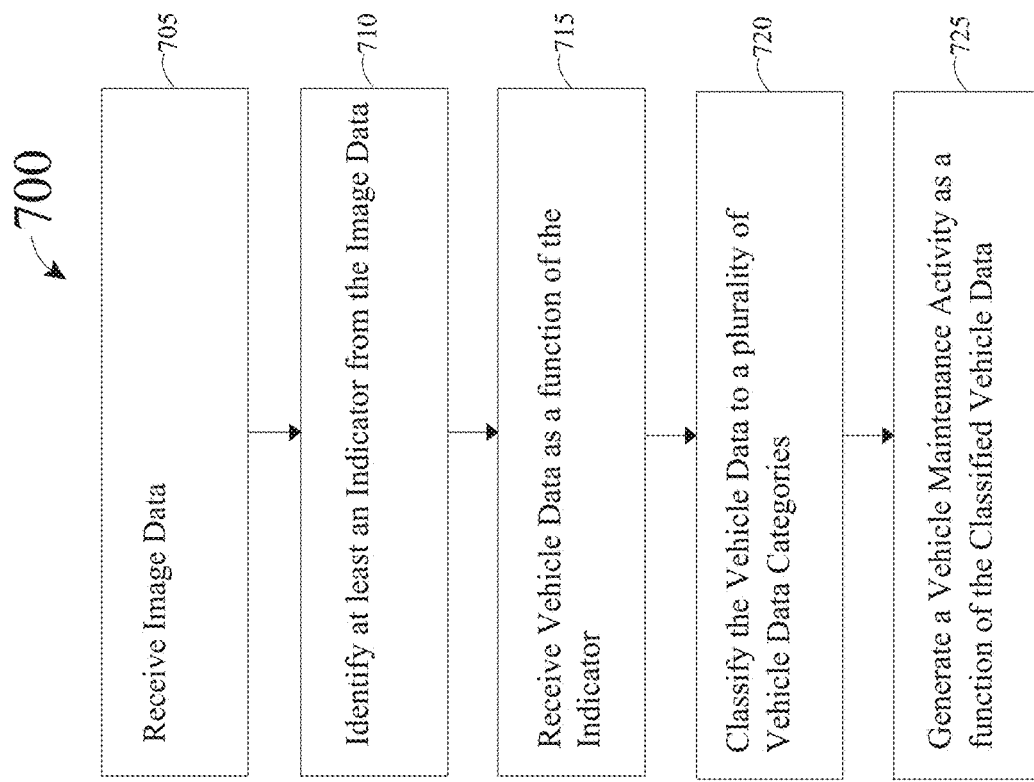
FIG. 7 is a flow diagram illustrating an exemplary method for generating a vehicle maintenance activity.

Referring now to FIG. 7, an flow diagram of a method 700 for generating a vehicle maintenance activity. At step 705, method 700 includes receiving, by a computing device, image data, for example, and as implemented in FIGS. 1-6. The image data may include a license plate of vehicle. At step 710, method 700 includes identifying, by the computing device, at least an indicator from the image data, for example, and as implemented in FIGS. 1-6. The at least indicator may include a license plate number. At step 715, method 700 includes receiving, by the computing device, vehicle data as a function of the indicator, for example, and as implemented in FIGS. 1-6. The vehicle data may include a user identification. The vehicle data may include a vehicle identification. The vehicle data may include service information. The service information may be updated as a function of the vehicle maintenance activity. Receiving the vehicle data may include performing a verification function based on the image data and vehicle data received. At step 720, method 700 includes classifying, by the computing device, the vehicle data to a plurality of vehicle data categories, for example, and as implemented in FIGS. 1-6. Classifying the vehicle data may include receiving a vehicle data training data set correlating an element of user identification information to a vehicle data group, training a vehicle data classifier as a function of receiving the vehicle data training data set, and outputting, utilizing the vehicle data classifier, a plurality of vehicle data categories classified to the vehicle data. At step 725, method 700 includes generating, by the computing device, a vehicle maintenance activity as a function of the classified vehicle data, for example, and as implemented in FIGS. 1-6. Generating the vehicle maintenance activity may include using a fuzzy set inference system.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
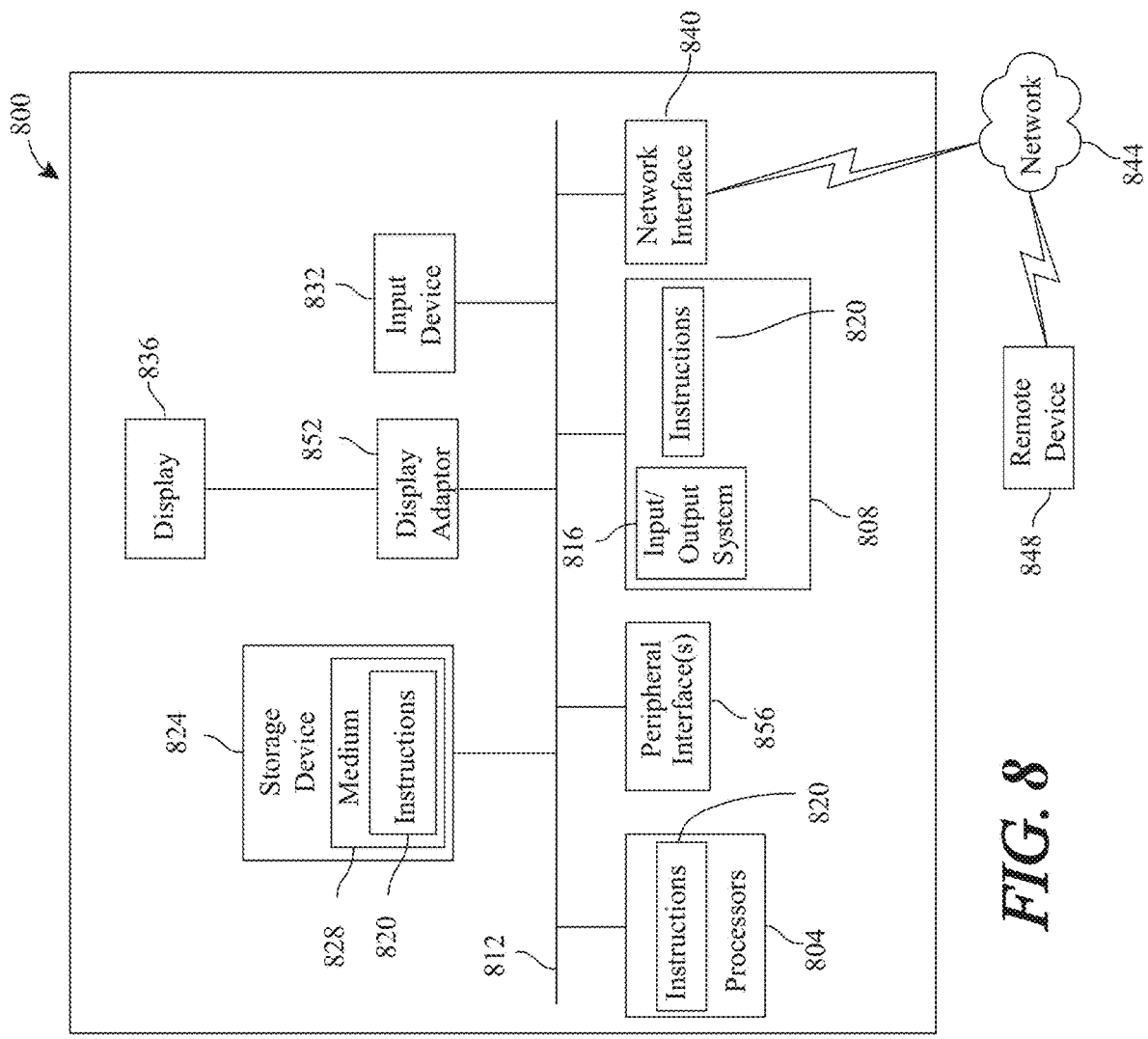
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatuses, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a vehicle maintenance activity, wherein the apparatus comprises:
   at least a processor; and
   a memory communicatively connected to the at least a processor, the memory containing instructions configuring the at least a processor to:
   receive image data;
   identify at least an indicator from the image data;
   receive vehicle data as a function of the indicator;
   classify the vehicle data to a plurality of vehicle data categories, wherein classifying the vehicle data further comprises:
     receiving a vehicle data training data set correlating an element of user identification information to a vehicle data group, wherein the user identification information comprises authorized user information;
     training a vehicle data classifier as a function of receiving the vehicle data training data set; and
     outputting, utilizing the vehicle data classifier, a plurality of vehicle data categories classified to the vehicle data using the vehicle data as an input; and
   generate a vehicle maintenance activity as a function of the classified vehicle data.

2. The apparatus of claim 1, wherein the image data comprises a vehicle credential.

3. The apparatus of claim 1, wherein the at least indicator comprises an alphanumeric credential associated within the vehicle.

4. The apparatus of claim 1, wherein the vehicle data comprises a user identification.

5. The apparatus of claim 1, wherein the vehicle data comprises a vehicle identification.

6. The apparatus of claim 1, wherein the vehicle data comprises service information.

7. The apparatus of claim 6, wherein the service information is updated as a function of the vehicle maintenance activity.

8. The apparatus of claim 1, wherein the at least processor is further configured to perform a verification function based on the image data and vehicle data received.

9. The apparatus of claim 1, wherein generating the vehicle maintenance activity comprises using a fuzzy set inference system.

10. A method for generating a vehicle maintenance activity, wherein the method comprises:
    receiving, by a computing device, image data;
    identifying, by the computing device, at least an indicator from the image data;
    receiving, by the computing device, vehicle data as a function of the indicator;
    classifying, by the computing device, the vehicle data to a plurality of vehicle data categories, wherein classifying the vehicle data further comprises:
      receiving a vehicle data training data set correlating an element of user identification information to a vehicle data group, wherein the user identification information comprises authorized user information;
      training a vehicle data classifier as a function of receiving the vehicle data training data set; and
      outputting, utilizing the vehicle data classifier, a plurality of vehicle data categories classified to the vehicle data using the vehicle data as an input; and
    generating, by the computing device, a vehicle maintenance activity as a function of the classified vehicle data.

11. The method of claim 10, wherein the image data comprises a vehicle credential.

12. The method of claim 10, wherein the at least indicator comprises an alphanumeric credential associated within the vehicle.

13. The method of claim 10, wherein the vehicle data comprises a user identification.

14. The method of claim 10, wherein the vehicle data comprises a vehicle identification.

15. The method of claim 10, wherein the vehicle data comprises service information.

16. The method of claim 15, wherein receiving the vehicle data further comprises updating the service information as a function of the vehicle maintenance activity.

17. The method of claim 10, wherein receiving the vehicle data comprises performing a verification function based on the image data and vehicle data received.

18. The method of claim 10, wherein generating the vehicle maintenance activity comprises using a fuzzy set inference system.

* * * * *